(12) United States Patent
Sato

(10) Patent No.: US 8,630,058 B2
(45) Date of Patent: Jan. 14, 2014

(54) DRIVE APPARATUS, LIBRARY APPARATUS, AND CONTROL METHOD THEREOF

(75) Inventor: Jun-ichi Sato, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 316 days.

(21) Appl. No.: 13/022,785

(22) Filed: Feb. 8, 2011

(65) Prior Publication Data

US 2011/0292531 A1    Dec. 1, 2011

(30) Foreign Application Priority Data

May 31, 2010   (JP) ................................. 2010-083783

(51) Int. Cl.
G11B 5/584    (2006.01)

(52) U.S. Cl.
USPC ......... 360/77.12; 360/31; 360/73.03; 360/75; 360/78.12

(58) Field of Classification Search
None
See application file for complete search history.

(56) References Cited

U.S. PATENT DOCUMENTS

| | | | | |
|---|---|---|---|---|
| 6,512,644 B1* | 1/2003 | Hall et al. | | 360/31 |
| 6,577,466 B2* | 6/2003 | Meyer et al. | | 360/75 |
| 7,280,293 B2* | 10/2007 | Nylander-Hill et al. | | 360/31 |
| 7,509,568 B2* | 3/2009 | Kapur et al. | | 714/799 |
| 7,746,588 B2* | 6/2010 | Koeppe et al. | | 360/48 |
| 7,898,758 B2* | 3/2011 | Leopold et al. | | 360/53 |
| 2003/0123175 A1* | 7/2003 | Gill et al. | | 360/53 |
| 2006/0103968 A1* | 5/2006 | Jurneke | | 360/76 |
| 2007/0253088 A1* | 11/2007 | Clarke et al. | | 360/72.2 |
| 2008/0112077 A1* | 5/2008 | Maejima et al. | | 360/122 |
| 2008/0266702 A1* | 10/2008 | Bliss | | 360/75 |

FOREIGN PATENT DOCUMENTS

| | | |
|---|---|---|
| JP | 58-070445 A | 4/1983 |
| JP | 02-058707 | 2/1990 |
| JP | 06-162626 | 6/1994 |
| JP | 08-235672 | 9/1996 |

* cited by examiner

*Primary Examiner* — Dismery Mercedes
(74) *Attorney, Agent, or Firm* — Fujitsu Patent Center

(57) ABSTRACT

A magnetic tape apparatus performs at least one of data reading processing and data writing processing on LTO wound around a reel. The magnetic tape apparatus causes the reel to rotate and move the LTO to a position at which the data writing processing or the data reading processing can be performed by a magnetic head. The magnetic tape apparatus is arranged along the width direction of the magnetic tape of LTO, which is driven, to detect medium abnormality that occurred in either a start-end or a stop-end in the width direction of the magnetic tape.

11 Claims, 10 Drawing Sheets

FIG.2

| SENSOR OUTPUT | | | SERVO HEAD OUTPUT | DATA HEAD OUTPUT | DETERMINATION OF TAPE EDGE DAMAGE | PROBABLE CAUSE | MEASURES |
|---|---|---|---|---|---|---|---|
| UPPER EDGE SIDE | THE OTHER | LOWER EDGE SIDE | | | | | |
| OK | OK | OK | OK | OK | ABSENCE | | NO MEASURES |
| OK | OK | OK | NG | OK | ABSENCE | DROPOUT OF SERVO PATTERN DEFECT ON MAGNETIC LAYER OF SERVO BAND FAILURE OF SERVO HEAD | PERFORM NORMAL RETRY OPERATION OR NO MEASURES |
| OK | OK | OK | OK | NG | ABSENCE | DROPOUT OF DATA PATTERN DEFECT ON MAGNETIC LAYER OF DATA BAND FAILURE OF DATA HEAD | PERFORM NORMAL RETRY OPERATION |
| NG | OK | OK | OK | OK | PRESENCE | DAMAGE AT UPPER EDGE | SKIPPING DAMAGE POINT |
| NG | OK | OK | NG | OK | PRESENCE | DAMAGE AT UPPER EDGE | SKIPPING DAMAGE POINT |
| NG | OK | OK | OK | NG | PRESENCE | DAMAGE AT UPPER EDGE | SKIPPING DAMAGE POINT |
| NG | OK | OK | NG | NG | PRESENCE | DAMAGE AT UPPER EDGE | SKIPPING DAMAGE POINT |
| OK | OK | NG | OK | OK | PRESENCE | DAMAGE AT LOWER EDGE | SKIPPING DAMAGE POINT |
| OK | OK | NG | NG | OK | PRESENCE | DAMAGE AT LOWER EDGE | SKIPPING DAMAGE POINT |
| OK | OK | NG | OK | NG | PRESENCE | DAMAGE AT LOWER EDGE | SKIPPING DAMAGE POINT |
| OK | OK | NG | NG | NG | PRESENCE | DAMAGE AT LOWER EDGE | SKIPPING DAMAGE POINT |
| NG | OK | NG | OK | OK | PRESENCE | DAMAGE AT UPPER AND LOWER EDGES | SKIPPING DAMAGE POINT |
| NG | OK | NG | NG | OK | PRESENCE | DAMAGE AT UPPER AND LOWER EDGES | SKIPPING DAMAGE POINT |
| NG | OK | NG | OK | NG | PRESENCE | DAMAGE AT UPPER AND LOWER EDGES | SKIPPING DAMAGE POINT |
| NG | OK | NG | NG | NG | PRESENCE | DAMAGE AT UPPER AND LOWER EDGES | SKIPPING DAMAGE POINT |

|  | HEAD VALUE (LPOS VALUE) | LENGTH | UPPER/ LOWER |
|---|---|---|---|
| DAMAGE POINT 1 | 00 00 09 01 h | 00 00 00 50 h | 00 h |
| DAMAGE POINT 2 | 00 00 0F 03 h | 00 00 01 00 h | 00 h |

|  | START-END INFORMATION (LPOS VALUE) | OFFSET VALUE FROM START-END | LENGTH | UPPER/ LOWER |
|---|---|---|---|---|
| DAMAGE POINT 1 | 00 00 07 B2 h | 00 00 01 4F h | 00 00 00 50 h | 00 h |
| DAMAGE POINT 2 |  | 00 00 07 51 h | 00 00 01 00 h | 00 h |

|  | HEAD VALUE (LPOS VALUE) | LENGTH |
|---|---|---|
| DAMAGE POINT 1 | 00 00 09 01 h | 00 00 00 50 h |
| DAMAGE POINT 3 | 80 00 01 50 h | 00 00 01 00 h |

DRIVE APPARATUS, LIBRARY APPARATUS, AND CONTROL METHOD THEREOF

CROSS-REFERENCE TO RELATED APPLICATION

This application is based upon and claims the benefit of priority of the prior Japanese Patent Application No. 2010-083783, filed on Mar. 31, 2010, the entire contents of which are incorporated herein by reference.

FIELD

The embodiments discussed herein are directed to a drive apparatus, a library apparatus, and a control method thereof.

BACKGROUND

From the past, a magnetic tape apparatus using an open reel-type recording medium has been used for recording of data. However, in recent years, use is changed to a magnetic tape apparatus utilizing a cartridge-type recording medium, and an autochanger and/or a tape library apparatus in which the magnetic tape apparatus is incorporated and a plurality of cartridges is carried to the magnetic tape apparatus by a robot. Examples of the cartridge-type recording medium include Linear Tape-Open (LTO), Digital Linear Tape (DLT), and Digital Data Storage (DDS).

In connection with the open reel-type, it is known that the physical damage such as Z folding, edge folding, and the like occurs. However, the magnetic tape cartridge also suffers from edge damage of a tape which is caused due to a winding step generated when a magnetic tape is wound. In greater detail, the winding step is easily formed in the magnetic tape cartridge when a magnetic tape is wound around a reel flange because air is involved in winding. For such a reason, various means for suppressing occurrence of winding unevenness are attempted. For example, a fine gap is provided between the reel flange and the magnetic tape. However, if an impact is applied to the magnetic tape cartridge in the vertical direction, that is, in a width direction of the magnetic tape cartridge, the winding step is generated at arbitrary points of the magnetic tape. In addition, when a space layer between adjacent turns of the magnetic tape forcibly contracts due to the temperature and humidity influence, the winding step is generated.

Furthermore, the LTO is in its fourth generation and the recording capacity has doubled after each generation so far. For example, the first generation had a capacity of 100 GB and the fourth generation has a capacity of 800 GB. For realization of this, there is a tendency that the magnetic tape increases in length and decreases in thickness. That is, concomitantly with a recent increasing capacity, the magnetic tape of the magnetic tape cartridge has become longer and thinner. This also leads to more frequent occurrence of edge folding. The Z folding means the damage of the magnetic tape in which the magnetic tape is folded and bent in Z shape. The edge folding means the damage of the magnetic tape like in FIG. 14. That is, it means the type of damage in which the edge (end) of the magnetic tape is folded and the magnetic tape is creased at a portion of the magnetic tape that is staggeredly wrapped due to the winding and fastening force of the magnetic tape. FIG. 14 is a diagram for explaining the edge folding.

As a technique of detecting such physical damages, there has been known a magnetic tape apparatus employing a technique of performing a detection with the use of light which is reflected from the magnetic tape and a technique of performing a detection with the use of the roughness of the magnetic tape, for example, before data is written into the magnetic tape. There also have been known a technique of allowing a portion of the magnetic tape to be in an erased state so that writing is skipped at the portions where the physical damage is detected and a technique of writing a dummy block into such portions.

Examples of the related art include Japanese Laid-open Patent Publication No. 58-070445, Japanese Laid-open Patent Publication No. 02-058707, Japanese Laid-open Patent Publication No. 08-235672, and Japanese Laid-open Patent Publication No. 06-162626.

However, the related arts have a problem in that it is difficult to detect abnormality of a medium such as edge folding. In greater detail, the related art technology determines the presence or absence of the physical damage of the magnetic tape at a writing target point just at a timing in which data is being written in the magnetic tape. Accordingly, it is impossible to detect the edge folding which is a factor of the physical damage generated in the vertical direction, that is, in the width direction of the magnetic tape. As a result, in spite of the presence of the edge folding, in a case where the damage at the writing target point of the magnetic tape is shallow, writing of data continues and is completed. However, in a case where the occurred physical damage develops further thereafter, a retry operation is performed many times when the recorded data is read out, which causes a problem of a delay in data processing. Furthermore, there is a problem in that retries of reading end up in failure sometimes.

SUMMARY

According to an aspect of an embodiment of the invention, a drive apparatus includes an access unit that performs at least one of data writing processing and data reading processing on a tape-shaped storage medium wound around a reel; a drive unit that rotates the reel to drive the tape-shaped storage medium to a predetermined position which allows the access unit to perform the data writing processing or the data reading processing; and a medium abnormality detecting unit that is arranged along a width direction of the tape-shaped storage medium driven by the drive unit to detect medium abnormality occurred in at least one of a start-end and a stop-end of the tape-shaped storage medium.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 2 is a diagram illustrating an example of information stored in an edge damage determination table;

DESCRIPTION OF EMBODIMENTS

Preferred embodiments of the present invention will be explained with reference to accompanying drawings but should not be construed to limit the invention.

[a] First Embodiment

In a drive apparatus disclosed by the present application, a tape-type storage medium such as linear tape-open (LTO) is incorporated in a magnetic tape apparatus that writes and reads data into and from a magnetic tape that stores servo information and/or user data. The present embodiment is explained with an example of a magnetic tape apparatus that writes and reads data into and from one storage medium which is set in the device, but the invention is not limited thereto. For example, this embodiment may be applied to a magnetic tape library apparatus incorporating the drive apparatus, therein, disclosed by the present application.

The magnetic tape apparatus according to the first embodiment includes a magnetic head composed of a servo head reading out servo information from a magnetic tape of LTO or the like and a data head performing a writing operation and a reading operation for user data. In the magnetic tape apparatus, sensors provided at both sides of the magnetic head in a traveling direction of the magnetic tape come into contact with the magnetic tape to acquire a value of capacitance that varies depending on a distance from the sensor to the magnetic tape for the entire range of the magnetic tape. Subsequently, the magnetic tape apparatus detects points at which a change amount in capacitance acquired by the sensor is equal to or more than a predetermined threshold value, as a point at which a physical damage occurred.

For example, the magnetic tape apparatus acquires the value of the capacitance for the entire range of the magnetic tape that is traveling utilizing the sensors to measure a change in capacitance per predetermined time. That is, the magnetic tape apparatus acquires the capacitance by using the distance between the magnetic head and the sensor, thereby measuring a change in capacitance per unit time. The magnetic tape apparatus determines a point with a small change amount as being absent of a medium abnormality and a point with a large change amount as being presence of a medium abnormality. Accordingly, the magnetic tape apparatus can determine the change amount for the entire range of the magnetic tape and as a result, it is possible to detect the medium abnormality that occurred at the edge.

Structure of Magnetic Tape Apparatus

Figure 1:
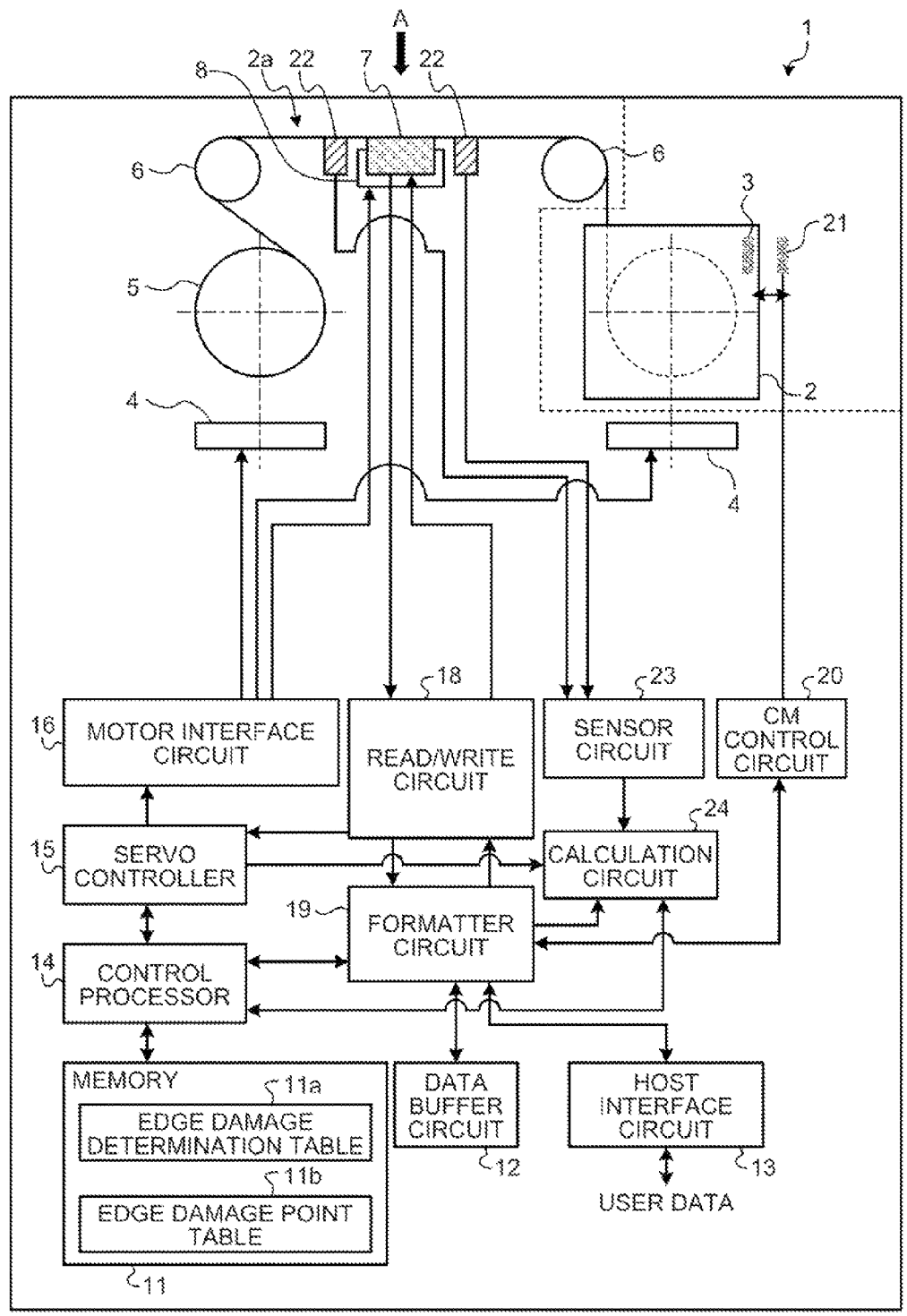
FIG. 1 is a block diagram illustrating the structure of a magnetic tape apparatus according to a first embodiment.

Referring to FIG. 1, the structure of the magnetic tape apparatus according to the first embodiment will be described. FIG. 1 is a block diagram illustrating the structure of the magnetic tape apparatus according to the first embodiment. A control unit described hereinafter is only an example but should not be construed to limit the invention.

As illustrated in FIG. 1, a magnetic tape apparatus 1 includes a cartridge tape 2 which is set in the apparatus, a reel motor 4, a tape drive-side reel 5, a tape guide mechanism 6, a magnetic head 7, and a head actuator mechanism 8. The magnetic tape apparatus 1 further includes a memory 11, a data buffer circuit 12, a host interface circuit 13, a control processor 14, a servo controller 15, and a motor interface circuit 16. The magnetic tape apparatus 1 still further includes a read/write circuit 18, a formatter circuit 19, a CM control circuit 20, an antenna circuit 21, sensor groups 22, a sensor circuit 23, and a calculation circuit 24.

The cartridge tape 2 is a storage medium of LTO or the like which receives a magnetic tape 2a storing servo information and/or user data therein. It has a cartridge memory (CM) 3 which is a non-contact memory storing an index, a use status, or the like of the cartridge tape 2. For example, the LTO has four data bands and five servo bands interleaving the respective data bands in a magnetic tape with a width of 12.6 mm. In the LTO, data is written in unit of a block. In fourth-generation LTO (LTO4), the width of one data track is 12 μm and thus 896 data tracks are written within a range of the width of the tape.

The reel motor 4 is connected to the motor interface circuit 16 and the tape drive-side reel 5 or a reel disposed inside the cartridge tape 2. The reel motor 4 rotates the tape drive-side reel 5 and the reel disposed inside the cartridge tape 2 according to an instruction operation of the motor interface circuit 16 so that the magnetic tape 2a is drawn from the cartridge tape 2 to be extended along the tape guide mechanism 6. In a similar manner, the reel motor 4 rotates the tape drive-side reel 5 and the reel disposed inside the cartridge tape 2 according to an instruction operation of the motor interface circuit 16 which will be described later so that the magnetic tape 2a that is drawn and extended is wound again around the cartridge tape 2 along the tape guide mechanism 6.

The magnetic head 7 is connected to the head actuator mechanism 8 and the read/write circuit 18. It has the servo head and the data head to read the servo information from the magnetic tape 2a which is accommodated in the cartridge tape 2 and to write in and read out data. For example, the magnetic head 7 reads out the servo information or data from a position of the magnetic tape which is forwarded by the head actuator mechanism 8 and output it to the read/write circuit 18. The magnetic head 7 writes the data, which is input from the read/write circuit 18, into the magnetic tape, at the position which is forwarded by the head actuator mechanism 8.

The head actuator mechanism 8 is connected to the magnetic head 7, the motor interface circuit 16, and the like to advance the magnetic head 7 to a predetermined position according to a driving current that is transmitted from the motor interface circuit 16.

The memory 11 is a storage unit storing control information used by the control processor 14 when controlling the magnetic tape apparatus 1 and has, for example, an edge damage determination table 11a and an edge damage point table 11*b*. Herein, the edge damage determination table 11*a* will be described with reference to FIG. 2 and the edge damage point table 11*b* will be described with reference to FIGS. 3 to 5.

FIG. 2 is a diagram illustrating an example of information stored in the edge damage determination table. As illustrated in FIG. 2, the edge damage determination table 11*a* stores "sensor output (upper edge, lower edge, the other), servo head output, data head output, determination of edge damage of a tape, probable causes, and measures". Respective items of the information that are stored are updated by a manager or the like at arbitrary timings.

The "upper edge of the sensor output" that is stored indicates whether or not a change in capacitance at the upper edge (start-end) of the magnetic tape 2*a* in the width direction is stable. When the output is stable, it is expressed as "OK" but when the output is unstable, it is expressed as "NG". "The other of the sensor output" indicates whether or not a change in capacitance at a midway portion other than the upper edge and the lower edge in the width direction of the magnetic tape 2*a* is stable. When the output is stable, it is expressed as "OK" but when the output is unstable, it is expressed as "NG". The "lower edge of the sensor output" indicates whether or not a change in capacitance at the lower edge (stop-end) of the magnetic tape 2*a* in the width direction is stable or not. When the output is stable, it is expressed as "OK" but when the output is unstable, it is expressed as "NG".

The "servo head output" indicates whether or not the position information or the like is correctly read out from the output of the servo head of the magnetic head 7. When correctly read out, it is expressed as "OK". When incorrectly read out, it is expressed as "NG". The "data head output" indicates whether or not the data information is read out correctly from the data head of the magnetic head 7. When correctly read out, it is expressed as "OK". When incorrectly read out, it is expressed as "NG". The "presence and absence of determination of tape edge damage" is information specifying whether or not the edge damage occurred, based on the result of the sensor output. That is, in the case in which "upper edge of sensor output" or "lower edge of sensor output" is expressed as "NG", "presence" is stored. Conversely, in the case in which "upper edge of sensor output" or "lower edge of sensor output" is expressed as "OK", "absence" is stored. The "probable causes" indicate failure or damage factors specified by "sensor output (upper edge, lower edge, the other), servo head output, data head output, and determination of edge damage of a tape." The "measures" indicate contents of actions with respect to the specified "probable causes".

For example, the calculation circuit 24 specifies a failure factor of the writing or the like on the basis of the information illustrated in FIG. 2 when the writing into the magnetic tape 2*a* ends in failure. Specifically, the calculation circuit 24 determines such that there is no particular abnormality and thus takes no specific measures when "determination of edge damage of a tape=absence and all of sensor output (upper edge, lower edge, the other), servo head output, and data head output are "OK". On the other hand, the calculation circuit 24 determines such that "a dropout of a servo pattern, a defect in a magnetic layer of a servo band, or a failure of a servo head" occurred when "determination of edge damage of a tape=absence and only the output of the servo head is NG". Therefore, the calculation circuit 24 specifies the contents of measures with "normal retry or no measures" and performs the specified measures.

The calculation circuit 24 determines such that "a dropout of a data pattern, a defect in a magnetic layer of a data band, and a failure of the data head" occurred when "determination of edge damage of a tape=absence and only the output of the data head is NG". Therefore, the calculation circuit 24 specifies the contents of measures with "normal retry" and performs the specified measures.

The calculation circuit 24 determines such that "damage of the upper edge" occurred regardless of the output statuses of the servo head and the data head when "determination of edge damage of a tape=presence and the upper edge of the sensor outputs is NG". The calculation circuit 24 specifies the contents of measures with "skipping a damaged point" and performs a control so as to write data into a different point of the magnetic tape, skipping the damaged point. Further, the calculation circuit 24 determines such that the "damage of the lower edge" occurred regardless of the output statuses of the servo head and the data head when "the determination of edge damage of a tape=presence and the lower edge of the sensor output is NG". Subsequently the calculation circuit 24 specifies the contents of measures with "skipping a damaged point" and performs a control so as to write data into a different point, skipping the damaged point.

Figures 3, 4, 5, 6:
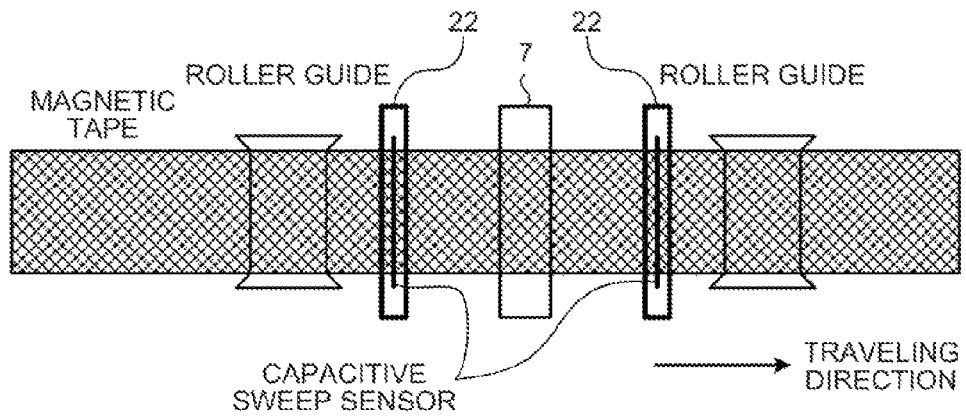
FIG. 3 is a diagram illustrating information on edge damage points stored in an edge damage point table, in which the information is expressed in the form of absolute values of LPOS values.
FIG. 4 is a diagram illustrating information of edge damage points stored in the edge damage point table, in which the information is expressed in the form of relative values from the beginning end of LPOS values.
FIG. 5 is a diagram illustrating an example of the case in which an upper edge and a lower edge are represented with the use of the most significant bit.
FIG. 6 is a diagram illustrating installation points of sensor groups when viewed in a direction of A of FIG. 1.

Next, the edge damage point table 11*b* will be described with reference to FIGS. 3 to 5. Hereinafter, an example in which position information representing edge damage points of LTO is expressed by linear position (LPOS) when LTO is used as the cartridge tape 2. FIG. 3 is a diagram illustrating information of edge damage points that is stored in the edge damage point table 11*b*, in which the information is represented by absolute values of LPOS values. FIG. 4 is a diagram illustrating information of edge damage points stored in the edge damage point table 11*b*, in which the information is represented by relative values of the LPOS values with respect to the beginning end of the LPOS values. FIG. 5 is a diagram illustrating an example in which the upper edge and the lower edge are represented by the most significant bit. In FIGS. 3 to 5, "h" represents a hex number. Respective items of information that are stored are updated whenever the edge damage points are specified by the calculation circuit 24.

For example, when the information is represented by the absolute values, as illustrated in FIG. 3, the edge damage point table 11*b* stores "head value (LPOS value), length, upper/lower" as the edge damage point. The "head value" stored is a value representing the head of the specified edge damage point and the "length" is a value representing the length from the head value in the traveling direction of the magnetic tape 2*a*. The "upper/lower" is a value representing the upper side or the lower side in the width direction of the magnetic tape 2*a*. The upper side (upper edge) is represented by "00h", and the lower side (lower edge) is represented by "01h". In the case of FIG. 3, Damaged point 1 means that an edge damage having a length of "00 00 00 50 h" exists at a position which is on the upper side at a distance from "00 00 09 01 h". Similarly, Damage point 2 means that an edge damage having a length of "00 00 01 00 h" exists at a position which is on the upper side at a distance from "00 00 0F 03 h".

In the case of the relative values, as illustrated in FIG. 4, the edge damage point table 11*b* stores "head information (LPOS value), offset value from the head, length, upper/lower" as the damaged point. The term "head information" stored is a value representing the starting position of the specified edge damage point. The term "offset value from the head" is a difference (distance) from the starting position to the ending position of the edge damage point in the width direction of the magnetic tape 2*a*. The term "length" is a value representing the length of the edge damage point. The term "upper/lower" is a value representing upper side or the lower side in the width direction of the magnetic tape 2*a*, in which the upper side (upper edge) is "00h" and the lower side (lower edge) is "01h". In the case of FIG. 4, Damaged point 1 means that an edge damage having a length of "00 00 00 50 h" that starts from a position of "00 00 07 B2 h" and ends at a position of "00 00 01 4F h" exists on the upper side. Damaged point 3 means that an edge damage having a length of "00 00 01 00 h" that starts from a position of "00 00 07 B2 h" and ends at a position of "00 00 07 51 h" exists on the upper side.

The length of the magnetic tape 2a can be represented by 3 bytes of the LOPS value and the fourth byte is not used. Accordingly, whether it is the upper edge or the lower edge can be represented by the fourth byte. For example, as illustrated in FIG. 5, when considering that "head value (LPOS value), length", is "00 00 09 01 h, 00 00 00 50 h", since the head of "00 00 09 01 h" is "0", the upper edge of the damage can be specified. Further, when "the head value (LPOS value), length" is "80, 00, 0F 03 h, 00 00 01 00 h", since the head of "80 00 0F 03 h" is "8", the lower edge of the damage can be specified. That is, in the case where the damage is at the upper edge, the fourth byte is set to "0"; and in the case where the damage is at the lower edge, the fourth byte is set to "8". In such a manner, the damaged point can be specified.

Referring back to FIG. 1, the data buffer circuit 12 is connected to the formatter circuit 19 and it is a storage region that temporarily stores writing target data that is received from a host. The data buffer circuit 12 reads out data from the magnetic tape 2a where the data is to be transmitted as a response to a request for reading that is received from the host. The data buffer circuit 12 is a storage region for temporarily storing data which has not been yet subjected to data compression or encoding performed by the formatter circuit 19.

The host interface circuit 13 is connected to the formatter circuit 19. It is an interface for receiving writing target data received from the host and outputting it to the formatter circuit 19. The host interface circuit 13 receives data, which is read from the magnetic tape 2a, from the formatter circuit 19 and sends it to the host.

The control processor 14 is connected to the servo controller 15, the formatter circuit 19, the calculation circuit 24, the memory 11, and the like. It is a circuit, such as a micro processing unit (MPU) or the like, for controlling the entire magnetic tape apparatus 1. For example, the control processor 14 controls respective processing units by decoding commands from the host and thus integrally controls the writing of data to the cartridge tape 2. For example, the control processor 14 controls and instructs the servo controller 15 not to perform writing at the damaged point stored in the edge damage point table 11b of the memory 11 when the data writing is instructed.

The control processor 14 causes the respective control units to operate so as to perform specified measures when a write error occurred and the contents of the damage and the measures were specified by the calculation circuit 24. For example, the control processor 14 instructs and controls the servo controller 15 and the read/write circuit 18 to perform a retry operation a given number of times when "usual retry" was notified from the calculation circuit 24 as the measures. Further, the control processor 14 instructs and controls the servo controller 15 or the like to write in data, skipping substantially the damaged point at which a write error occurs actually when "skipping a damaged point" was notified as the measures from the calculation circuit 24.

The control processor 14 decodes a request for reading that is issued from the host, and controls the servo controller 15 so that the magnetic head 7 comes to be located at a position at which target data is stored. The control processor 14 sends the data read by the magnetic head 7 to the host which is the request origin via the formatter circuit 19, the data buffer circuit 12, and the host interface circuit 13.

The servo controller 15 is connected to the motor interface circuit 16, the control processor 14, the read/write circuit 18, the calculation circuit 24, and the like. The servo controller 15 controls the location of the magnetic head 7 based on the servo information that is read from the magnetic tape 2a by the servo head of the magnetic head 7.

For example, the servo controller 15 determines whether or not the position information that is input from the read/write circuit 18 agrees with the damaged point that is stored in the edge damage point table 11b according to the instruction from the control processor 14. When they agree with each other, the servo controller 15 controls the motor interface circuit 16 to skip the agreed point. Further, when the instruction of skipping a present target point is received from the control processor 14, the servo controller 15 controls the motor interface circuit 16 to skip the corresponding point.

The servo controller 15 receives the servo information reading state of the servo head of the magnetic head 7, that is, the output state of the servo head from the read/write circuit 18, and outputs them to the calculation circuit 24. The servo controller 15 controls the motor interface circuit 16 so that the magnetic head 7 does not move from the present writing position when the servo controller 15 receives the instruction of a retry operation from the control processor 14.

The motor interface circuit 16 is connected to the servo controller 15, the reel motor 4, and the head actuator mechanism 8, and it has a motor driver or the like. For example, the motor interface circuit 16 controls the drive power which is output to the head actuator mechanism 8 according to the output (instruction) of the servo controller 15 and thus controls the position of the magnetic head 7. The motor interface circuit 16 makes the reel motor revolve according to the output (instruction) of the servo controller 15 and takes the magnetic tape 2a out of the cartridge tape 2 and causes the magnetic tape 2a to be wound around the cartridge tape 2.

The read/write circuit 18 is connected to the servo controller 15, the magnetic head 7, and the formatter circuit 19, and performs a reading operation and a writing operation of data through the magnetic head 7. For example, the read/write circuit 18 outputs the servo information that is read from the magnetic tape 2a by the servo head of the magnetic head 7 to the servo controller 15. The read/write circuit 18 outputs the user data that is read from the magnetic tape 2a by the data head of the magnetic head 7 to the formatter circuit 19. The read/write circuit 18 writes the user data that is received from the formatter circuit 19 at a predetermined point of the magnetic tape 2a using the data head of the magnetic head 7.

The formatter circuit 19 is connected to the control processor 14, the read/write circuit 18, the CM control circuit 20, and the calculation circuit 24, and performs data compression, encoding, and decoding. For example, the formatter circuit 19 receives the user data that is read from the read/write circuit 18 through the magnetic head 7, decodes the user data, stores the decoded user data in the data buffer circuit 12, and outputs it to the host interface circuit 13. The formatter circuit 19 receives the writing target data from the host interface circuit 13, and compresses or encodes the corresponding user data, and outputs the compressed or encoded data to the read/write circuit 18.

When the retry instruction is received from the control processor 14, the formatter circuit 19 instructs and controls the read/write circuit 18 to perform a retry operation. The formatter circuit 19 outputs the information that is read from the CM 3 of the cartridge tape 2 by the CM control circuit 20 to the control processor 14. When the formatter circuit 19 receives the writing instruction and the writing information to be written into the CM 3 from the control processor 14, the formatter circuit 19 outputs the corresponding instruction and information to the CM control circuit 20.

Furthermore, the formatter circuit 19 receives the writing or reading status of the user data in the data head of the magnetic head 7, i.e., the output state of the data head, from the read/write circuit 18 and outputs it to the calculation circuit 24 and the control processor 14. For example, the formatter circuit 19 receives information representing success or failure in data writing or data reading from the read/write circuit 18 and outputs it to the calculation circuit 24 and the control processor 14.

The CM control circuit 20 is connected to the formatter circuit 19 and the like, writes data into the CM 3 of the cartridge tape 2 using the antenna circuit 21, and reads out the data from the CM 3. For example, the CM control circuit 20 outputs to the formatter circuit 19 an index that is acquired from the CM 3 of the cartridge tape 2 using the antenna circuit 21 and the information on the use situation. The CM control circuit 20 writes the corresponding information into the CM 3 of the cartridge tape 2 using the antenna circuit 21 when the writing information is received from the formatter circuit 19.

The sensor groups 22 are connected to the sensor circuit 23 and installed at both sides of the magnetic head 7 in the traveling direction of the magnetic tape 2a. The sensor group 22 is composed of hundreds of capacitive sweep sensors arranged along the width direction of the magnetic tape 2a. An installation point of the sensor group 22 is described in detail with reference to FIG. 6. FIG. 6 is a diagram illustrating the installation point of the sensor group, which is viewed in a direction A of FIG. 1. As illustrated in FIG. 6, the sensor groups 22 are arranged on the front and back sides of the magnetic head 7, respectively in the traveling direction of the magnetic tape 2a, in such a way of interposing the magnetic head 7 between them. Although the case where two sensor groups 22 are installed on the front and back sides of the magnetic head 7, respectively is illustrated as an example, but the installation may not be limited to such configuration. For example, only one, that is, Z of FIG. 6, may be installed on the front side of the magnetic head 7 in the traveling direction of the magnetic tape 2a. Each of the hundreds of capacitive sweep sensors of the sensor group 22 comes into contact with the magnetic tape 2a and changes the accumulation amount of the electric charge depending on the distance between themselves and the magnetic tape 2a.

The sensor circuit 23 is connected to the sensor groups 22 and the calculation circuit 24. Each of the capacitive sweep sensors of the sensor groups 22 converts the amount of electric charge, which accumulates, to a capacitance value, and outputs it to the calculation circuit 24. Further, the capacitance value is an electric capacity or a capacitance representing the distance between the magnetic tape 2a and the capacitive sweep sensor, that is, the accumulating amount of the electric charge that varies due to unevenness of the magnetic tape 2a. Therefore the hundreds of above are just an example and each of the sensor groups 22 may include a number of capacitive sweep sensors as many as that the unevenness of the magnetic tape 2a can be detected.

The calculation circuit 24 is connected to the sensor circuit 23, the servo controller 15, the formatter circuit 19, and the control processor 14 and detects medium abnormality such as the edge folding. Specifically, the calculation circuit 24 detects the medium abnormality that occurred in at least one of the start-end and the stop-end of the magnetic tape 2a in the width direction of the magnetic tape 2a based on the capacitance value detected by the sensor circuit 23. For example, when a request for writing is issued from the host, the calculation circuit 24 detects the point at which the capacitance value detected by the sensor circuit 23 for a predetermined time changes by an amount equal to or more than the threshold value that causes a predetermined action as a point where the edge damage occurred.

Figure 7:
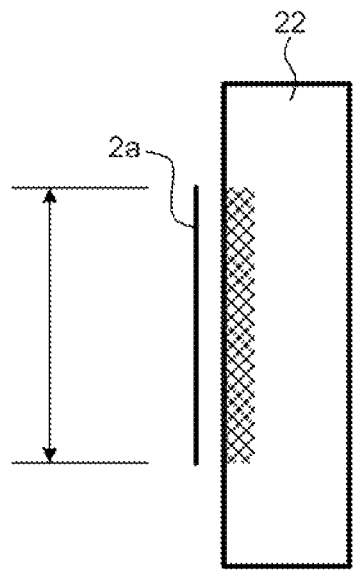
FIG. 7 is a diagram illustrating an example of the case in which a magnetic tape has no edge damages.
Figure 8:
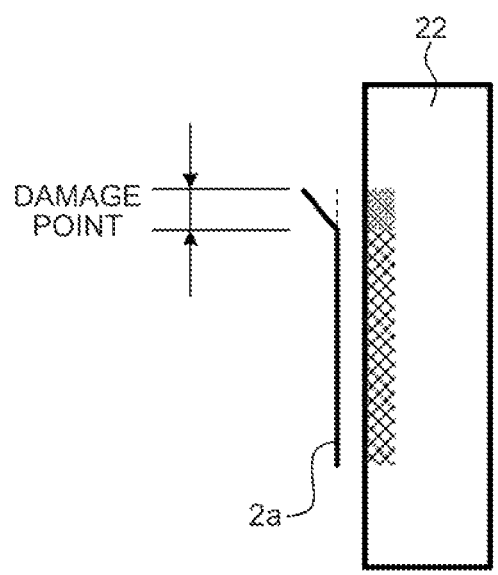
FIG. 8 is a diagram illustrating an example of the case in which a magnetic tape has edge damage.

In greater detail, when there is no edge damage in the magnetic tape 2a as illustrated in FIG. 7, the capacitive sweep sensors uniformly contact the magnetic tape 2a, so the stable electric charge amount, that is, the predetermined electric charge amount accumulates. On the other hand, when there is edge damage in the magnetic tape 2a as illustrated in FIG. 8, the capacitive sweep sensors non-uniformly contact the magnetic tape 2a, so the electric charge amount is unstable, that is, the accumulation amount is not constant. Therefore, the calculation circuit 24 can specify the point at which the capacitance value obtainable from the sensor circuit 23 is not constant as an edge damage point. Further, FIG. 7 is a diagram illustrating an example in which there is no edge damage in the magnetic tape and FIG. 8 is a diagram illustrating an example in which there is edge damage in the magnetic tape.

When an edge damage point is detected, the calculation circuit 24 specifies the position information (LPOS) representing the position of the corresponding damaged point among the positions of the servo information that are read by the servo head and the positions or the like of the capacitive sweep sensors that detect the capacitance values that are not constant. The calculation circuit 24 stores the LPOS of a specified edge damage point into the edge damage point table 11b of the memory 11 through the control processor 14.

Figure 9:
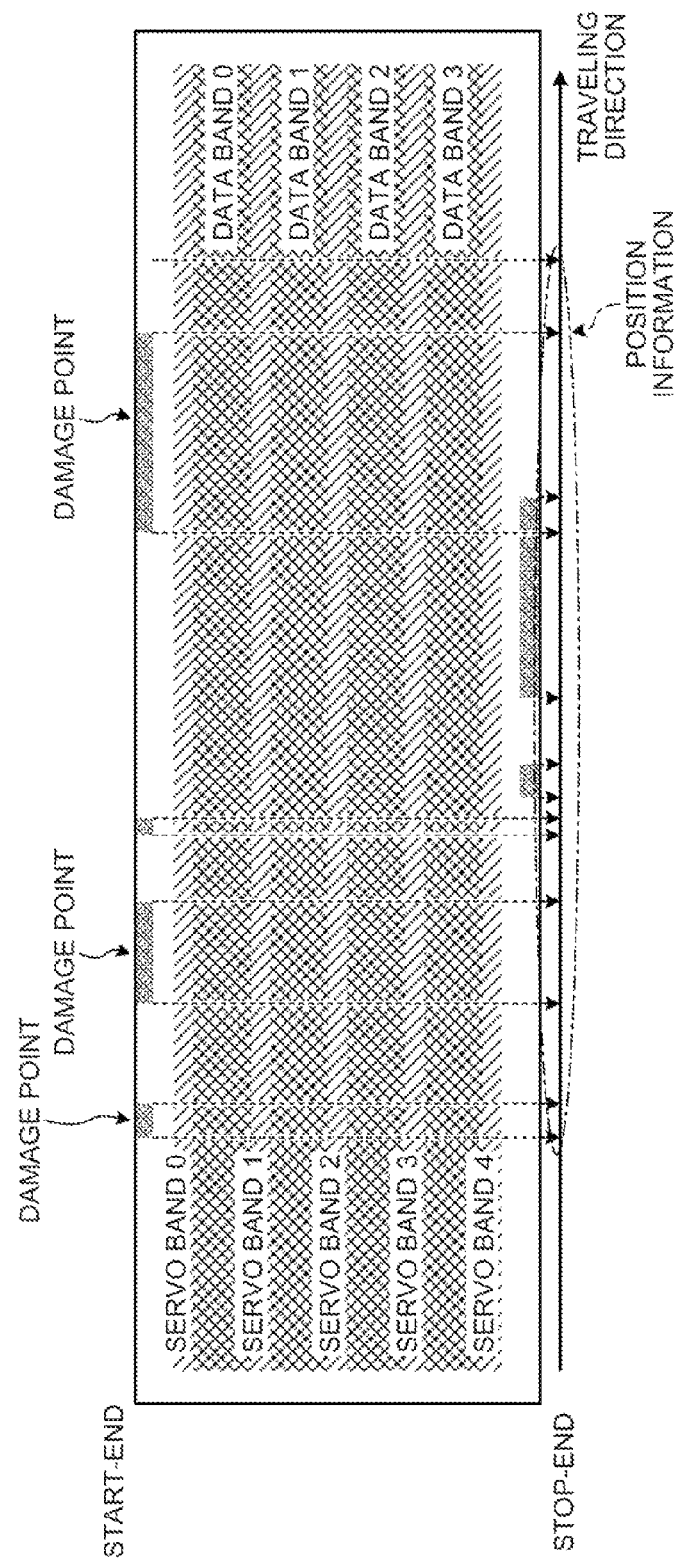
FIG. 9 is a diagram illustrating an example of information representing positions of edge damage that are detected and stored.

In greater detail, when more than one edge folding of the magnetic tape 2a are detected as illustrated in FIG. 9, the calculation circuit 24 acquires the position information of a range starting from the head (start-end) to the tail (stop-end) of each edge folding in the traveling direction of the magnetic tape 2a by the above-described technique. The calculation circuit 24 stores the position information of the specified edge folding point into the edge damage point table 11b of the memory 11 by a denotation method illustrated in FIGS. 3 to 5. In addition, FIG. 9 is a diagram illustrating an example of information that is detected as position of the edge damage and stored.

The calculation circuit 24 can specify the measure for the edge damage or details of the edge damage with reference to the edge damage determination table 11a stored in the memory 11. For example, when a request for writing is issued, the calculation circuit 24 acquires the output state of the servo head from the servo controller 15 and acquires the output state of the data head from the formatter circuit 19. In addition, as described above, the calculation circuit 24 acquires the output state of each of the capacitive sweep sensors from the sensor circuit 23 and determines whether or not there is medium abnormality such as an edge folding. After that, the calculation circuit 24 specifies "probable causes" corresponding to respective states with reference to the edge damage determination table 11a. Furthermore, the calculation circuit 24 specifies a "measure" corresponding to the specified "probable cause".

Next, the calculation circuit 24 makes an instruction and performs a control to execute the processing according to the specified "measure". For example, the calculation circuit 24 instructs the control processor 14 to perform a write retry operation when the contents of the specified "measure" is "retry". The calculation circuit 24 instructs the control processor 14 to perform an avoiding action, for example, a way of skipping the present writing position or a way of writing dummy data into the present writing position when the contents of the specified "measure" is "avoidance of a damaged point".

Flow of Processing

Figure 10:
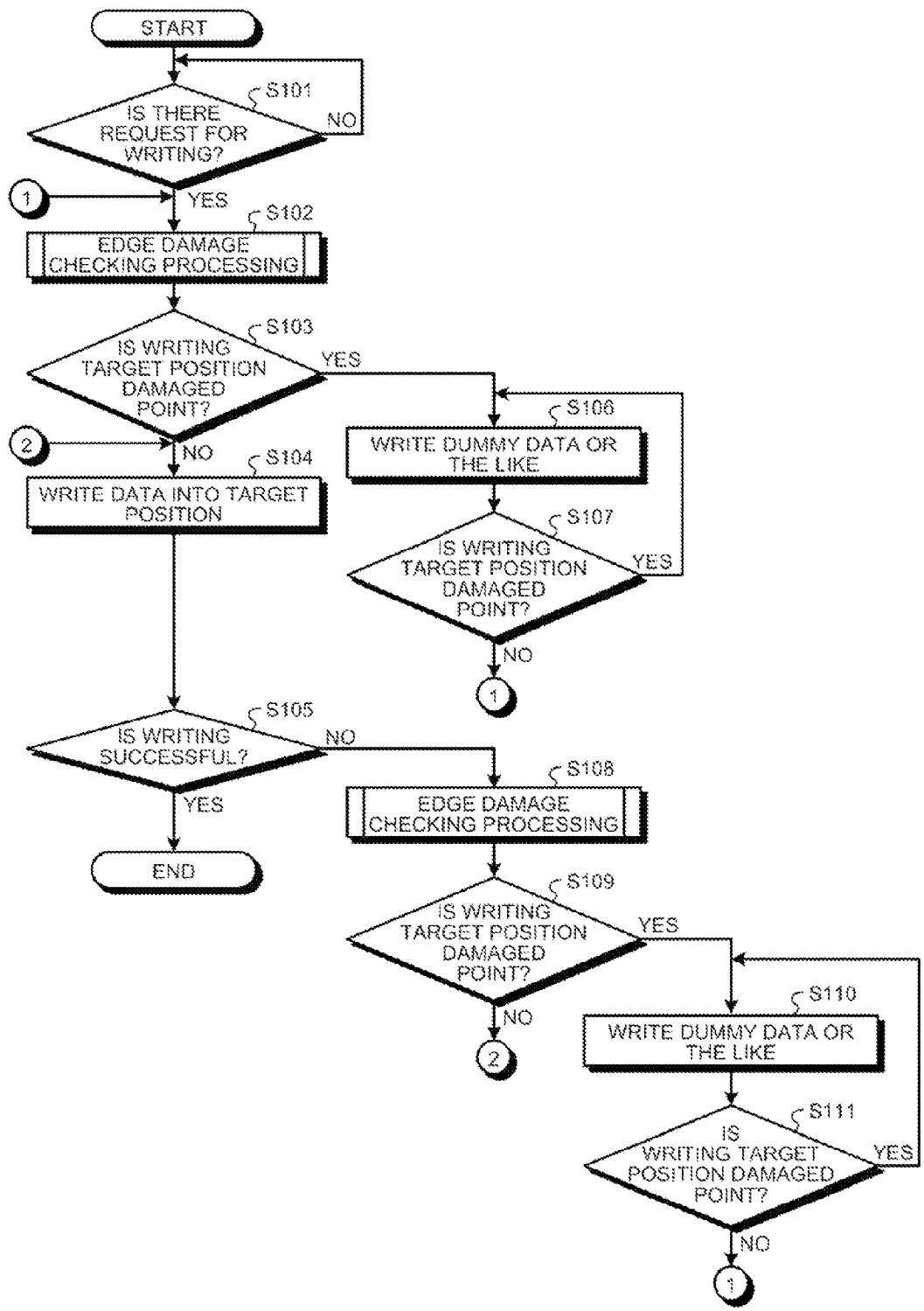
FIG. 10 is a flow chart illustrating the flow of data writing processing performed in the magnetic tape apparatus according to the first embodiment.
Figure 11:
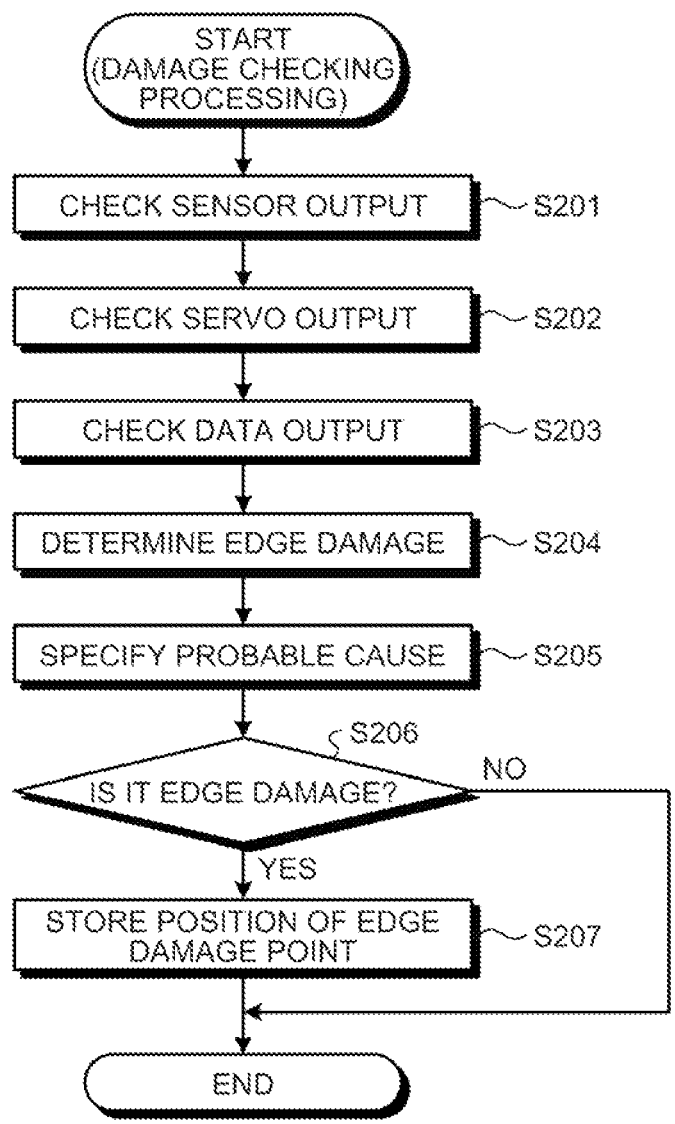
FIG. 11 is a flow chart illustrating the flow of edge damage determination processing in the data writing processing.

Next, the flow of processing in the magnetic tape apparatus according to the first embodiment will be described with reference to FIG. 10 and FIG. 11. FIG. 10 is a flow chart illustrating the flow of data writing processing in the magnetic tape apparatus according to the first embodiment and FIG. 11 is a flow chart illustrating the flow of edge damage determination processing in the data writing processing. In addition, the processing illustrated in FIG. 11 is processing corresponding to step S102 or step S108 of FIG. 10.

Flow of Data Writing Processing

As illustrated in FIG. 10, when a request for writing is issued in the magnetic tape apparatus 1 (Yes in Step S101), the calculation circuit 24 performs edge damage checking processing in Step S102.

When it is determined such that a writing target point has no edge damage by the edge damage checking processing (No in Step S103), the calculation circuit 24 writes data into the target point in Step S104. When the writing ends (Yes in Step S105), the calculation circuit 24 ends the writing processing.

On the other hand, when it is determined such that the writing target point has some edge damages (Yes in Step S103), the calculation circuit 24 takes actions according to the contents of the measure for the specified edge damage point with reference to the edge damage determination table 11a in Step S106. That is, the calculation circuit 24 performs a damage recovery operation such as an operation of just forwarding the tape without writing (that is, skipping the writing target point) or an operation of writing dummy data therein.

As far as the damaged point continues (Yes in Step S107), the calculation circuit 24 performs the processing of Step S106. On the other hand, when the damaged point ends (No in Step S107), the calculation circuit 24 performs processing of the steps subsequent to Step S102.

When the writing processing fails in Step S105 (No in Step S105), the calculation circuit 24 performs the edge damage checking processing in Step S108.

When it is determined such that the writing target point has no edge damage by the edge damage checking processing (No in Step S109), the calculation circuit 24 performs processing of the steps subsequent to Step S105. That is, the calculation circuit 24 performs a writing retry operation at the same point at which the writing failed.

On the other hand, when it is determined such that the writing target point has some edge damages (Yes in Step S109), the calculation circuit 24 performs the damage recovery operation such as an operation of just forwarding the tape, skipping the writing target point and an operation of writing dummy data in Step S110. While the damaged point continues (Yes in Step S111), the calculation circuit 24 performs processing of Step S110. On the other hand, when the damaged point ends (No in Step S111), the calculation circuit 24 performs processing of the steps subsequent to Step S102.

Flow of Edge Damage Checking Processing

As illustrated in FIG. 11, the calculation circuit 24 that has performed the edge damage checking processing acquires and checks output states of the respective capacitive sweep sensors in Step S201. Next, the calculation circuit 24 acquires and checks the output state of the servo head from the servo controller 15 in Step S202, and acquires and checks the output state of the data head from the formatter circuit 19 in Step S203.

The calculation circuit 24 determines whether or not medium abnormality such as edge folding occurred based on the output state of each capacitive sweep sensor in Step S204. After that, the calculation circuit 24 specifies "probable cause" based on the results of from Step S201 to Step S204 and the edge damage determination table 11a in Step S205.

When "probable cause" is "upper edge damage or lower edge damage" (Yes in Step S206), the calculation circuit 24 acquires LOPS of the present writing point and stores it as the edge damage point in the edge damage point table 11b in Step S207.

On the other hand, when "probable cause" is other than the "upper edge damage or lower edge damage" (No in Step S206), the calculation circuit 24 ends the processing. Further processing of Step S201 to Step S203 may be performed in arbitrary order, and the edge damage may be determined only by Step S201.

Effects of First Embodiment

As such, according to the first embodiment, the magnetic tape apparatus 1 determines such that a point of the medium, at which a change amount is small, is normal and determines such that a point of the medium, at which a change amount is large, is abnormal. Therefore, since the magnetic tape apparatus 1 can determine the change amount of the entire range of the magnetic tape, the medium abnormality occurring at the edges may be detected. Furthermore, since the sensor group 22 is provided in front of the magnetic head 7 in the magnetic tape apparatus 1, the edge damage or the like may be detected prior to the writing.

According to the first embodiment, since the capacitive sweep sensors are used, the edge damage of the tape may be detected. By the operation of writing while skipping the damaged point, it is possible to suppress an increase in processing time of the reading and writing operations that is a result from the retry operation when writing. As a result, it is possible to do efficient writing and reading. Further, since it is possible to avoid writing data into the point where the damage is shallow, it is possible to prevent occurrence of an event in which reading of the written data from being disabled as the damage develops further. Furthermore, since it is possible to set the number of retry reading operations based on the information representing the degree of damage, it is possible to perform writing and reading depending on the degree of damage.

[b] Second Embodiment

The magnetic tape apparatus having the drive apparatus disclosed by the present application not only can detect the edge damage which has occurred already, as described with reference to the first embodiment, but also can detect the edge damage that has not yet developed to the extent of abnormality and hence it is possible to detect the state that abnormality is likely to occur.

Specifically, the minute electric power that is read by the magnetic head 7 is amplified and is adjusted to a constant value in the read/write circuit 18 of the magnetic tape apparatus 1. Since the signal that is amplified and adjusted has a predetermined value, abnormality cannot be determined. In second embodiment, the power that is read by the read/write circuit 18 of the magnetic tape apparatus 1 can be directly acquired without intervention of the servo controller 15. Since the magnetic tape apparatus 1 can detect an event, in which the power does not exceed the abnormality threshold value but is not normal, continuously occurs, the state in which abnormality is likely to occur can be predicted.

Figure 12:
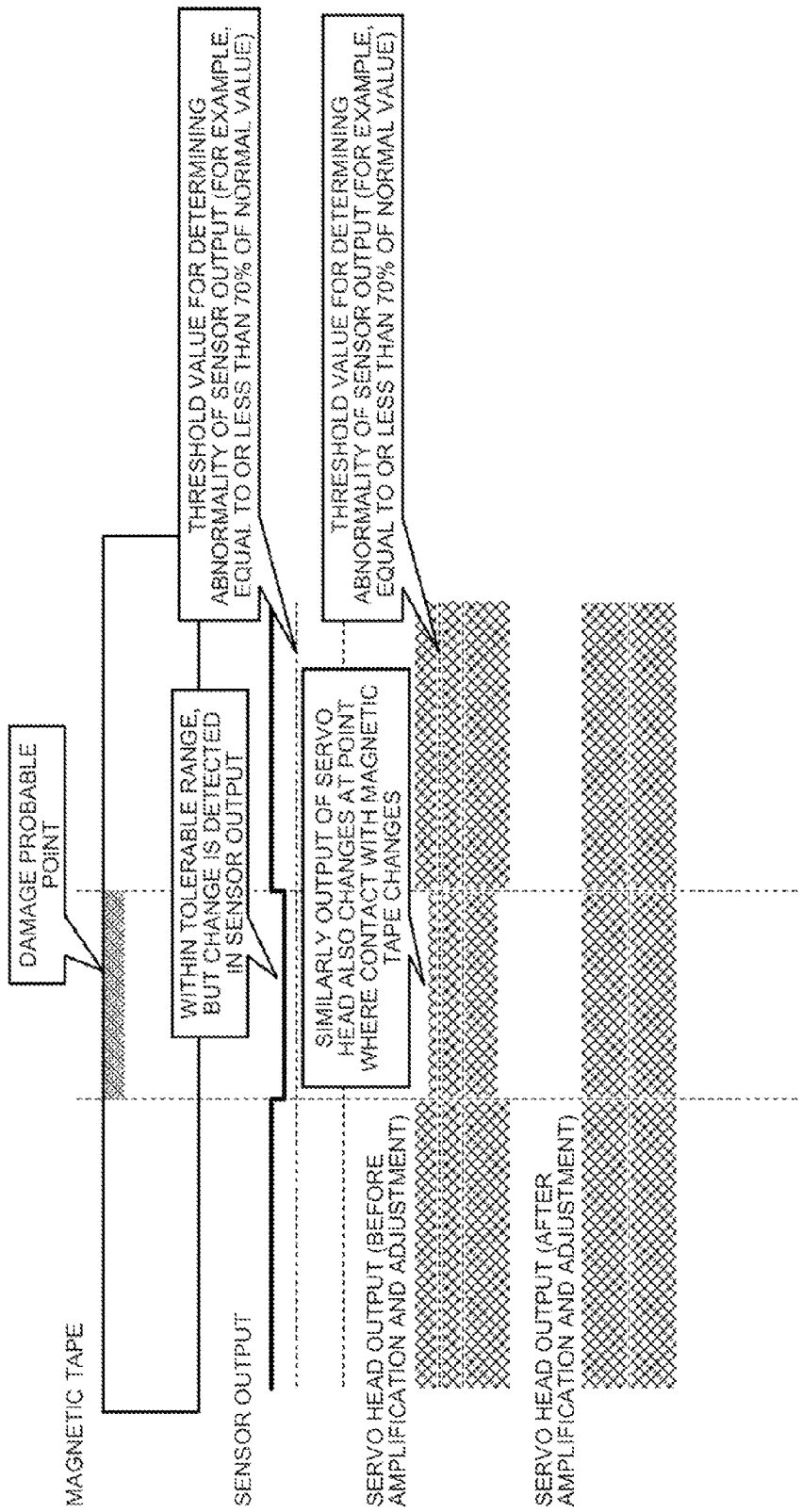
FIG. 12 is a diagram for explaining prediction of a medium abnormality.

First an abnormality prediction operation will be described with reference to FIG. 12. FIG. 12 is a diagram for explaining a prediction operation of medium abnormality. As illustrated in FIG. 12, from the outputs of the sensors that are output from the sensor groups 22 of the magnetic tape apparatus 1, a value which is within a tolerable range but is not a normal value, can be detected for the point where the edge damage on the magnetic tape 2a is predicted, and the value is output to the sensor circuit 23. From the output of the servo head in the point where the edge damage is predicted, a value which is within a tolerable range but is abnormal is detected. In general, the output of the servo head is amplified by the servo controller 15 or the like, and adjusted to a constant value. Therefore, in the second embodiment, the power that is read by the read/write circuit 18 of the magnetic tape apparatus 1 can be directly acquired without intervention of the servo controller 15.

The magnetic tape apparatus 1 stores abnormality probable position information, in which information on a position where the output of the sensor is not normal is associated with the output value of the sensor, the output value of the servo head, or the like, in the memory 11 or the like. After that, when the position where the output value of the sensor is not normal is detected continuously or a given number of times, the magnetic tape apparatus 1 detects such position as the abnormality probable position.

Figure 13:
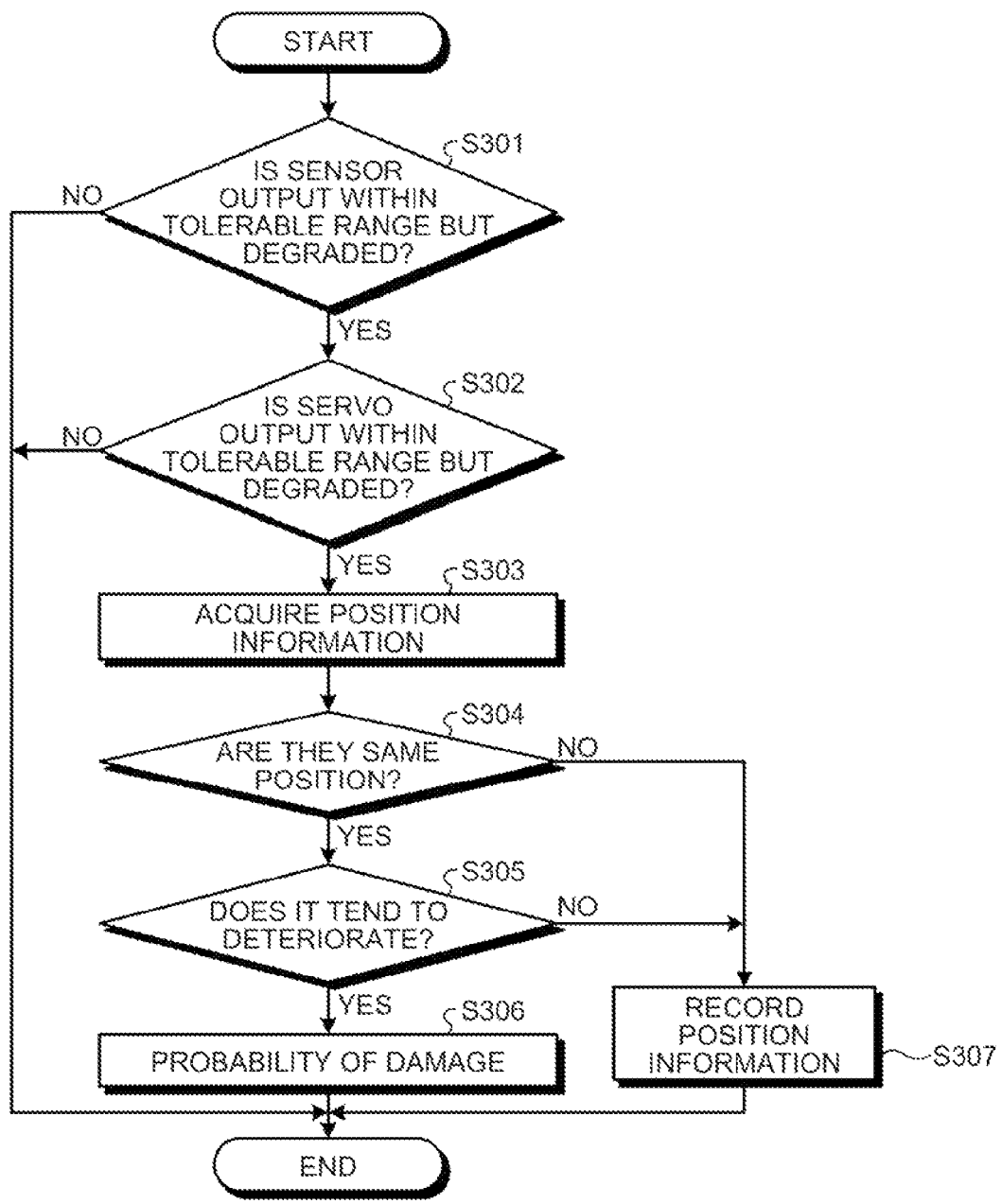
FIG. 13 is a flow chart illustrating the flow of abnormality prediction processing according to a second embodiment.
Figure 14:
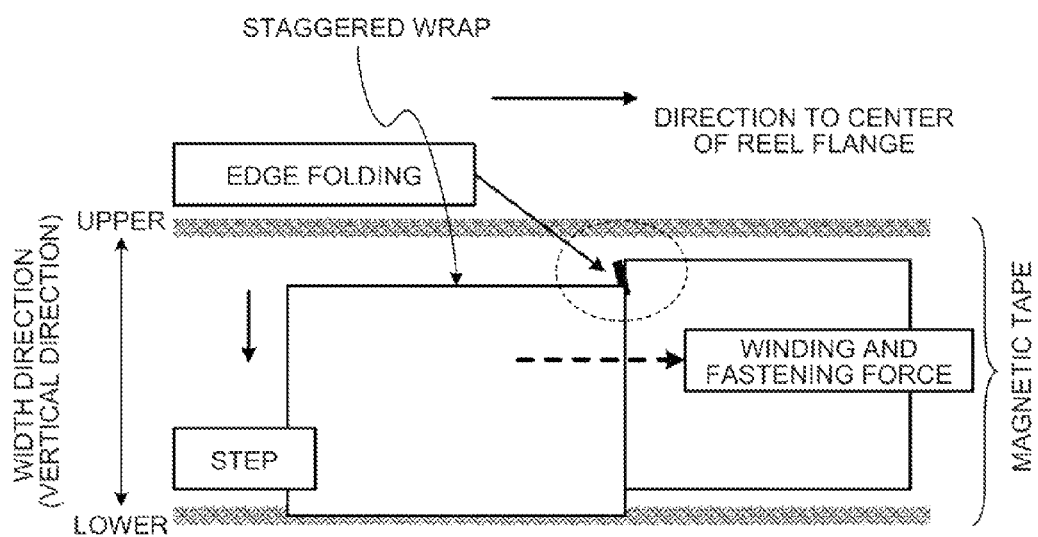
FIG. 14 is a diagram for explaining edge folding.

Next, the flow of abnormality prediction processing is described with reference to FIG. 13. FIG. 13 is a flow chart illustrating the flow of abnormality prediction processing according to the second embodiment. As illustrated in FIG. 13, the calculation circuit 24 of the magnetic tape apparatus 1 acquires the output value of each sensor of the sensor group 22 from the sensor circuit 23, and determines whether or not it is within a tolerable range but is below a normal value in Step S301.

When the output value of each sensor is lower than a normal value (Yes in Step S301), the calculation circuit 24 determines whether or not the output value detected by the servo head is within a tolerable range but is below a normal value in Step S302.

Next, when the output value of the servo head is below a normal value (Yes in Step S302), the calculation circuit 24 acquires information on the abnormality probable position that is detected in advance and stored in the memory 11 or the like in Step S303.

When a present processing target position agrees with the position that is stored as the abnormality probable position information (Yes in Step S304), the calculation circuit 24 determines whether or not the output value of the sensor or the output value of the servo head deteriorates in Step S305.

After that, when it is determined such that the output value of the sensor or the output value of the servo head deteriorates (Yes in Step S305), the calculation circuit 24 stores the present processing target position in the memory 11 or the like as the damage probable position in Step S306.

On the other hand, when the present processing target position does not agree with the position stored as the abnormality probable position information (No in Step S304), the calculation circuit 24 determines such that it is temporary. When it is determined such that the output value of the sensor or the servo header does not deteriorate (No in Step S305), the calculation circuit 24 performs processing of Step S307. Specifically, the calculation circuit 24 stores the abnormality probable position information in which the present processing target position is associated with the output value of the sensor, the output value of the servo header, or the like, in the memory 11 or the like.

When the output value of each sensor is not below a normal value (No in Step S301) or an output value of the servo header is not below a normal value (No in Step S302), the calculation circuit 24 ends the processing.

As such, according to the second embodiment, since the position where the edge damage is likely to occur can be predicted and stored in the memory 11, early detection of the medium abnormality can be realized. When a writing error occurs in the position where the edge damage is likely to occur, there is a possibility that the position deteriorates. Accordingly, a control may be performed in which the number of the retry operations is limited or no retry operation is performed. When a writing error occurs in the position where the edge damage is likely to occur, a control may be performed in which no retry operation is performed.

[c] Third Embodiment

Although some embodiments of the invention are described hereinabove, the invention may be implemented also in more various forms of embodiments besides the above-described embodiments. So, hereinafter, other embodiments that fall within the scope of the invention will be described with a third embodiment.

Storing a Damage Point in a Cartridge

For example, the information which is stored in the edge damage point table 11b explained in the first embodiment (see FIGS. 3 to 5) may be stored in the CM 3 of the cartridge tape 2. Specifically, the control processor 14 issues an instruction so that the information stored in the edge damage point table 11b of the memory 11 is read and stored in the CM control circuit 20 via the formatter circuit 19. The CM control circuit 20 may store the received information in the CM 3 by using the antenna circuit 21.

Without having to read out data from the memory 11, information may be received from the formatter circuit 19 or the like at a timing in which it is saved in the edge damage point table 11b of the memory 11 by the calculation circuit 24, and then be stored in the CM 3. As such, since information on the damaged point is written into the CM 3, the damaged point information is grasped prior to reading and writing operations when the cartridge tape 2 is used in a different magnetic tape apparatus. Therefore, efficient reading and writing can be performed. The magnetic tape apparatus of a linear serpentine system like LTO can perform an operation in which a magnetic tape runs in a reciprocating manner many times, but the edge damage point of the magnetic tape can be grasped by at least once of one-way forwarding.

Calculation of Writing Capacity of Cartridge

For example, by storing the edge damage point of the cartridge tape 2 in the CM 3, a total capacity of the edge damage points of the cartridge tape 2 can be calculated. In more detail, as illustrated in FIGS. 3 to 5, since it is possible to store the length of the edge damage points, the total length of the edge damage points can be calculated. Therefore, the total capacity can be calculated from the total length. As a result, it is possible to calculate a memory size value of an area that excludes the damaged points of the cartridge tape and being capable of allowing writing therein. When the calculated memory size value falls below the nominal value of the cartridge tape, the magnetic tape apparatus 1 gives a caution, a warning, or the like to the host side, thereby aggressively preventing the use of the damaged cartridge tape and encouraging writing on a cartridge tape with a good quality.

Application to Library Apparatus

For example, the drive apparatus of the present application may be applied to a magnetic tape library apparatus which can read and write data into more than one magnetic tape cartridges at the same time using more than one magnetic read/write heads. For this instance, the edge damage determination table 11a and the edge damage point table 11b are provided in the memory 11 as information that is stored in the CM of the cartridge tape, using identifiers by which each of the cartridge tapes is uniquely identified. If the cartridge tape 2 is set, the control processor 14 acquires the identifier from the CM 3 by using the CM control circuit 20. After that, the control processor 14 can perform processing as in the first and second embodiments with the use of tables such as the edge damage determination table 11a and the edge damage point table 11b that correspond to the acquired identifiers.

Structure of System and Others

Each of constitutional elements of the illustrated magnetic tape apparatus is conceived in terms of a function and is not necessary to be physically constructed. The distribution and integration of the elements in the apparatus are not limited to the illustrated ones. That is, the apparatus or parts of the apparatus may be distributed or integrated functionally or physically in an arbitrary number of units depending on types of loads and use circumstances. Each processing function performed in each apparatus may be entirely or partially realized by an MCU (a control device such as a central processing unit (CPU) and an MPU). It can be also realized in the form of a program that is analyzed and executed by the MCU (or a control device such as CPU, MPU, and the like) or in the form of hardware based on wired logic.

All or the part of the processing that are described to be automatically performed in the embodiments may be performed in manual. Further, all or the part of the processing that is described to be performed in manual in the embodiments may be performed automatically by way of common knowledge. In addition, the order of processing set forth in the document or indicated by the figures, the control order, and specific names, and various kinds of data and information including parameters, for example, illustrated in FIGS. 2 to 5 may be arbitrarily changed unless stated otherwise.

According to embodiments of the drive apparatus, the library apparatus, and the control method thereof disclosed in the present application, the medium abnormality at the edge of the medium can be detected.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A drive apparatus comprising:
   an access unit that performs at least one of data writing processing and data reading processing on a tape-shaped storage medium wound around a reel;
   a drive unit that rotates the reel to drive the tape-shaped storage medium to a predetermined position which allows the access unit to perform the data writing processing or the data reading processing; and
   a medium abnormality detecting unit that is arranged along a width direction of the tape-shaped storage medium driven by the drive unit, acquires a capacitance by using a distance between the medium abnormality detecting unit and the tape-shaped storage medium, measures a change in capacitance per unit time, and detects medium abnormality occurred in at least one of a start-end and a stop-end of the tape-shaped storage medium based on the change.

2. The drive apparatus according to claim 1, wherein the medium abnormality detecting unit is provided between the access unit and the reel.

3. The drive apparatus according to claim 1, further comprising:
   a storage unit that stores point information representing a point of the tape-shaped storage medium at which abnormality occurred,
   wherein the access unit performs the data writing processing or the data reading processing based on the point information stored in the storage unit.

4. The drive apparatus according to claim 1, further comprising:
   a read abnormality detecting unit that detects abnormality that occurred in the tape-shaped storage medium based on a result from reading of data by the access unit; and
   an abnormality type determining unit that determines a type of abnormality occurred in the tape-shaped storage medium based on a result of the abnormality detection by the medium abnormality detecting unit and the read abnormality detecting unit,
   wherein the access unit selects retry processing for recovering the abnormality occurred in the tape-shaped storage medium based on a determination result from the abnormality type determining unit.

5. The drive apparatus according to claim 1, further comprising:
   a tolerable point storage unit that stores a tolerable point being a value within a tolerable range where a result from the reading of data by the access unit indicates a detection of not being abnormal; and
   a risky point specifying unit that specifies the tolerable point as a risky point where the medium abnormality probably will occur when the result from the reading of data by the access unit indicates that the number of instances of reading that is a value within the tolerable range exceeds a threshold value, with respect to the tolerable point stored in the tolerable point storage unit.

6. The drive apparatus according to claim 5, wherein the access unit does not perform a retry operation when a data writing error occurs in the risky point specified by the risky point specifying unit.

7. The drive apparatus according to claim 1, wherein the medium abnormality detecting unit detects an abnormal point and a risky point based on the change,
   wherein the abnormal point is a point where the capacitance is larger than a first threshold value and where the medium abnormality is occurring, and
   the risky point is a point where the capacitance, that is smaller than the first threshold value and larger than a normal value, is acquired a predetermined number of times and a point where the medium abnormality probably will occur.

8. A library apparatus comprising:
   a media retaining unit that retains a plurality of tape-shaped storage media wound around reels;
   an access unit that performs at least one of data writing processing and data reading processing on the tape-shaped storage media retained by the media retaining unit;

a drive unit that acquires the tape-shaped storage medium which is a processing target of the access unit from the medium retaining unit, rotates the reel of the acquired tape-shaped storage medium, and drives the tape-shaped storage medium to a predetermined point which allows the access unit to perform the data writing processing or the data reading processing; and a medium abnormality detecting unit that is arranged along a width direction of the tape-shaped storage medium driven by the drive unit, acquires a capacitance by using a distance between the medium abnormality detecting unit and the tape-shaped storage medium, measures a change in capacitance per unit time, and detects medium abnormality occurred in at least one of a start-end and a stop-end of the tape-shaped storage medium in a width direction of the tape-shaped storage medium based on the change.

9. The library apparatus according to claim 8, wherein the medium abnormality detecting unit detects an abnormal point and a risky point based on the change, wherein the abnormal point is a point where the capacitance is larger than a first threshold value and where the medium abnormality is occurring, and the risky point is a point where the capacitance, that is smaller than the first threshold value and larger than a normal value, is acquired a predetermined number of times and a point where the medium abnormality probably will occur.

10. A method for controlling a drive apparatus, comprising:

performing at least one of data writing processing and data reading processing on a tape-shaped storage medium wound around a reel;

rotating the reel to drive the tape-shaped storage medium to a predetermined position which allows the data writing processing or the data reading processing;

acquiring a capacitance by using a distance between the tape-shaped storage medium and a sensor that is arranged along a width direction of the tape-shaped storage medium driven at the rotating;

measuring a change in capacitance per unit time;

detecting medium abnormality occurred in at least one of a start-end and a stop-end of the tape-shaped storage medium based on the change.

11. The method according to claim 10, wherein the detecting includes detecting an abnormal point and a risky point based on the change, wherein the abnormal point is a point where the capacitance is larger than a first threshold value and where the medium abnormality is occurring, and the risky point is a point where the capacitance, that is smaller than the first threshold value and larger than a normal value, is acquired a predetermined number of times and a point where the medium abnormality probably will occur.

* * * * *

UNITED STATES PATENT AND TRADEMARK OFFICE
CERTIFICATE OF CORRECTION

Page 1 of 1

PATENT NO. : 8,630,058 B2
APPLICATION NO. : 13/022785
DATED : January 14, 2014
INVENTOR(S) : Jun-ichi Sato It is certified that error appears in the above-identified patent and that said Letters Patent is hereby corrected as shown below:

On the Left hand Column of the Title page of the Patent, the Foreign Application Priority Data should be corrected as shown below:

-- Item (30) Foreign Application Priority Data

March 31, 2010   (JP) ...........................2010-083783 --

Signed and Sealed this
Seventeenth Day of June, 2014

Michelle K. Lee
*Deputy Director of the United States Patent and Trademark Office*